Jan. 20, 1931.  F. A. A. ESSMANN  1,789,731
COMBINED OSCILLATORY OR RETRACTABLE CRANE AND WEIGHING SCALE
Filed June 19, 1929  3 Sheets-Sheet 1
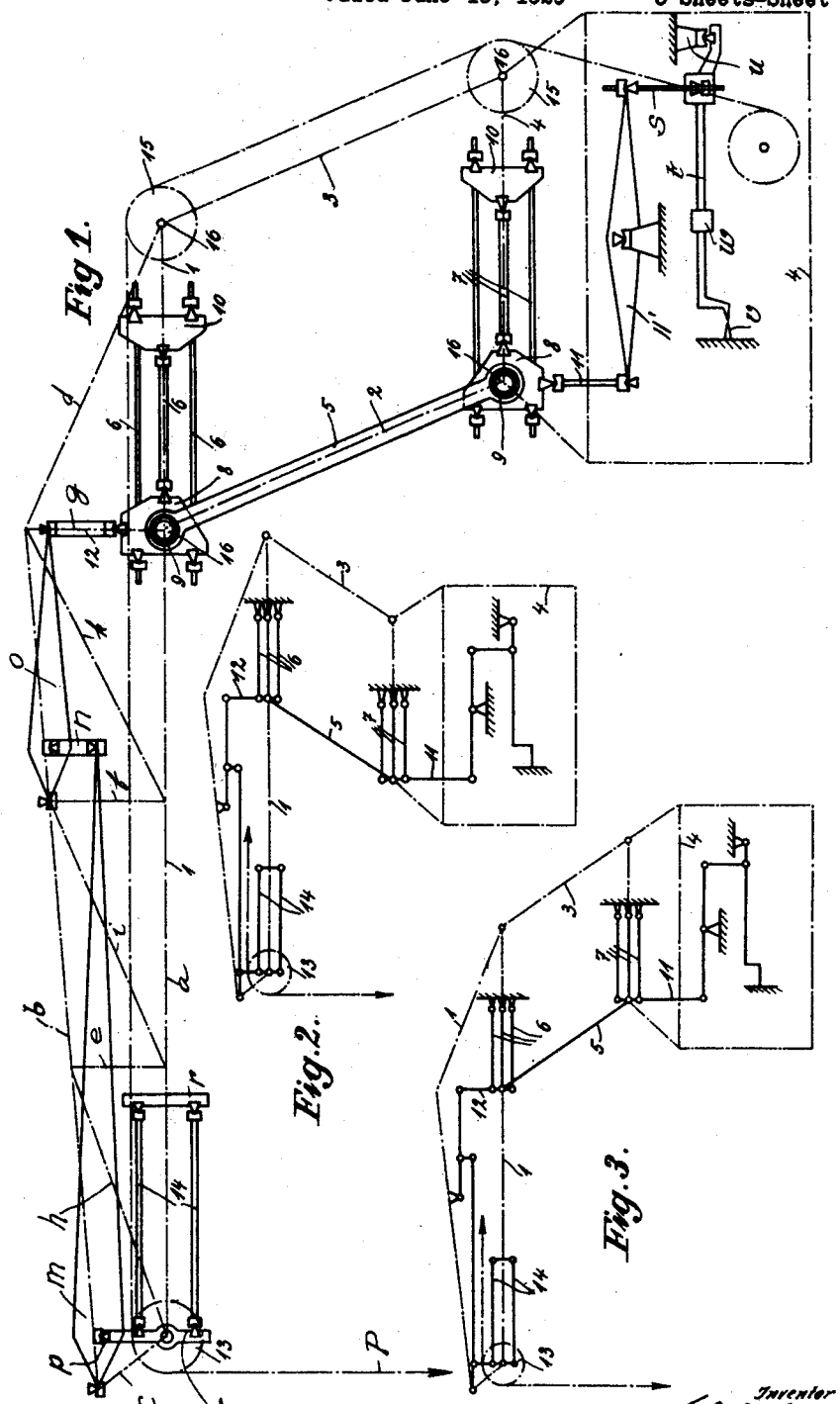

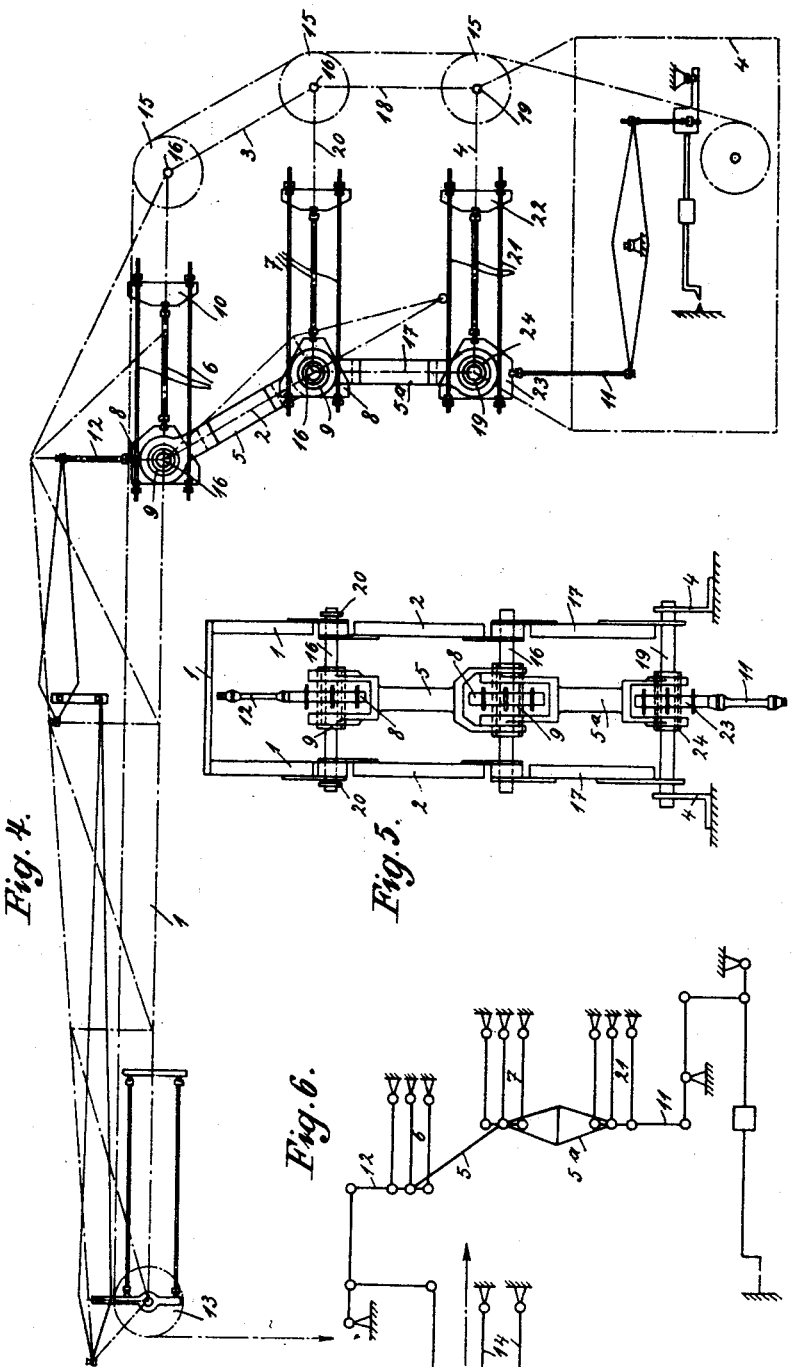

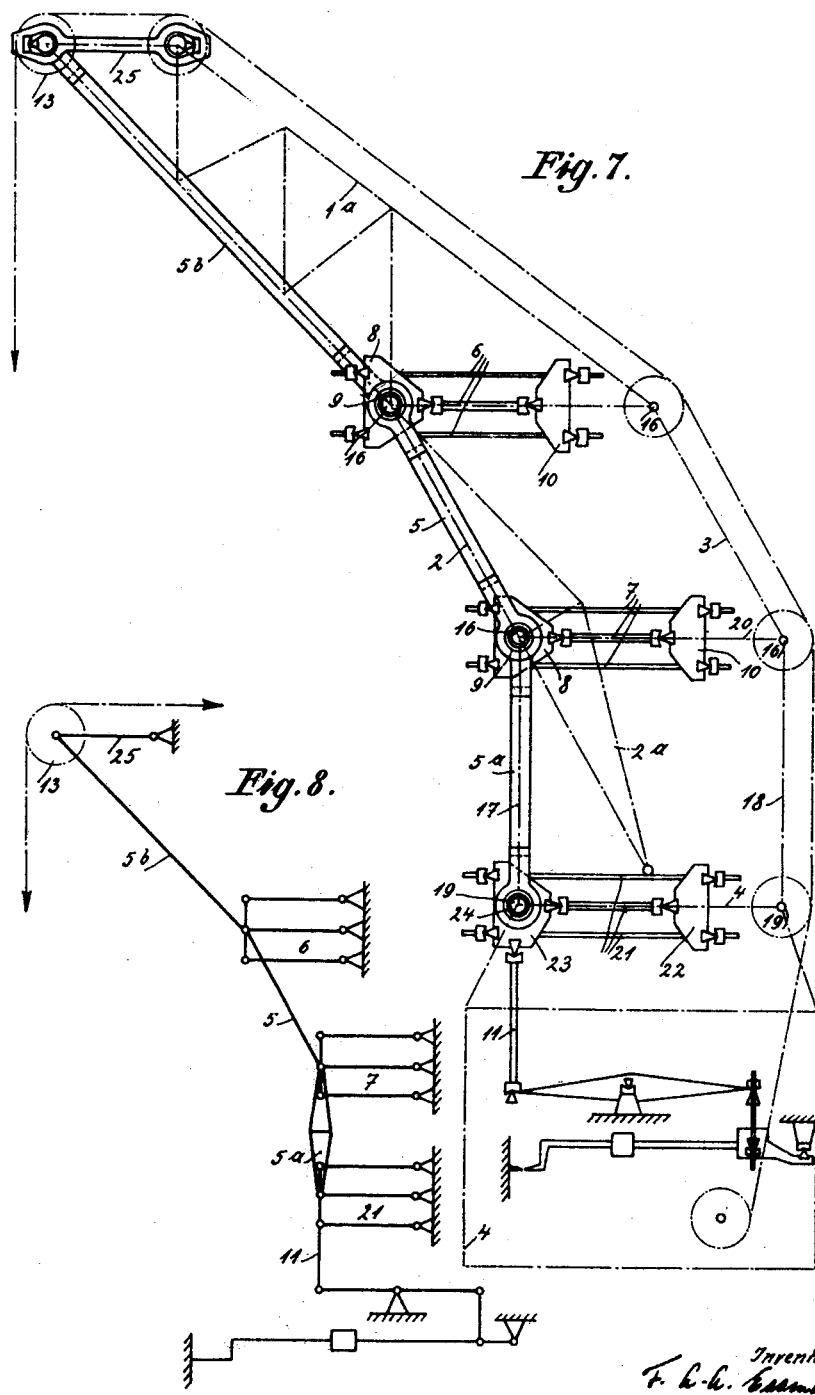

Patented Jan. 20, 1931

1,789,731

UNITED STATES PATENT OFFICE

FRIEDRICH AUGUST ALBERT ESSMANN, OF ALTONA-NIENSTEDTEN, GERMANY

COMBINED OSCILLATORY OR RETRACTABLE CRANE AND WEIGHING SCALE

Application filed June 19, 1929, Serial No. 372,137, and in Germany July 3, 1928.

The subject of this invention is a combined oscillatory or retractable crane and weighing scale.

It has been proposed heretofore to combine with a weighing scale an oscillatory or retractable crane of which the jib is supported on links, and in which the crank being retracted is guided by links so as to perform parallel movements. In one construction of such cranes one part of the scale is arranged within the jib and the load taken up by this part of the scale is transmitted by bell crank levers to a sliding weight beam, which is arranged in or on the framing of the crane. With such cranes the use of bell-crank levers results in inaccuracies in weighing. In other constructions the complete weighing scale, including the operator's cabin, is arranged within or on the jib. Such construction requires an operator for the weighing scale and a separate operator for the crane. The necessity for two operators makes the use of the machine uneconomical and the arrangement of the scale and the location of the operator's cabin and of the operator within or on the jib makes balancing of the jib by a counter weight necessary, such balancing being only possible in large cranes.

The primary object of the present invention is to construct a combined retractable or oscillatory crane and weighing scale which is capable of being operated by a single operator, and which needs no balancing weight for the jib and which may be manufactured in small or large sizes and will register weighing with the utmost accuracy.

The invention consists in the feature that a bar, which is guided by links and subjected to the action of the load either directly or indirectly and itself acts on a scale lever, is arranged parallel to the oscillatory supports in all adjusted positions, and the links of the bar are supported at their ends in such manner that the links move parallel to themselves when the oscillatory supports are oscillated.

The bar guided by the links may be single, or a number of such may be joined together forming a broken line.

In the accompanying drawings Fig. 1 illustrates diagrammatically a combined crane and scale, constructed in accordance with the invention, the retractable crane being shown in chain-dotted lines; Figs. 2 and 3 are diagrammatic views showing a modification, Fig. 3 showing the parts in a different position from that shown in Fig. 2; Fig. 4 is a diagrammatic elevation showing a further modification and Fig. 5 a view at right-angles thereto; Fig. 6 is a diagrammatic view showing the bars used in the construction illustrated in Figs. 4 and 5; Fig. 7 is an elevation showing a further modification, the crane being shown in chain-dotted lines and Fig. 8 is a diagrammatic view showing the bars and links used in the construction shown in Fig. 7.

Referring to the construction shown in Fig. 1, a horizontally disposed jib 1 is carried by parallel oscillatory supports 2, 3 pivoted to a crane frame 4. A bar 5 is maintained parallel to the oscillatory supports 2 on top by pairs of links 6, a central link 6 ensuring the correct spacing of knife-edge carriers, 8, 10 from one another and at the bottom by pairs of links 7, a central link 7 serving a similar object as the aforesaid link 6. Adjacent ends of the links of each pair of links engage knife-edge carriers 8 which are mounted on tubes 9 provided on the ends of the bar 5. The other ends of each pair of links are supported on the relative knife-edge carrier 10 which is firmly attached to the jib 1 or to the frame 4 of the crane. A knife-edge on the carrier 8 at the lower end of the bar 2 engages the upper end of a rod 11 the lower end of which rests on a scale lever in the frame 4. The lower end of a rod 12 engages a knife-edge on the carrier 8 at the upper end of the bar 2, the weight of the load being transmitted through said rod 12 by means of two scale levers supported in the jib 1. To this end a load carrying roller 13 is suspended on one scale lever by a hanger and is thus prevented from yielding to the horizontal pull of the rope by a link 14 against which the hanger bears. The bar 5 is thus indirectly influenced on top by the weighing load and acts on the scale below. The rope is led to the winch over rollers 15 arranged on the pivot bolts of the oscillatory support 3.

The upper knife-edge carrier 10 is so arranged that it compels the links to retain their normal position on all adjustments of the bar 5 effecting the several oscillatory positions of the supports 2 and 3, that is to say, they move parallel to themselves. Hereby, on the one hand, accuracy in weighing is secured and, on the other hand, transmission of weight is effected by the bar 5 on cranes having a jib carried by oscillatory supports.

The tubes or sockets 9 of the bar 5 surround, with a sufficient amount of play, bolts 16 connecting the oscillatory supports 2 with the jib 1 and the frame 4 of the crane so as to permit easy movement of the bar 5 during weighing. It is an advantage but not a necessity, to have the tubes 9 and bolts 16 coaxially disposed. It is, however, a necessity that the bar 5 be arranged and guided parallel to the oscillatory supports 2.

In the construction shown the jib 1 is constructed as a lattice girder, the upper boom $a$ and the lower boom $b$ being connected at the front by an inclined strut $c$, and at the hinder end by the oblique strut $d$ and moreover by the vertical struts $e$, $f$ and $g$ and also by diagonals $h$, $i$ and $k$. On the front point of the lattice girder rests the scale lever $m$ with its front end, which at the other end engages a hanger $n$, which is suspended from a second scale lever $o$, the other end of which being journalled at the center of the jib with one end and rests with the other end on the rod 12. It is to be remarked that on the knife-edge $p$ of the scale lever $m$ a hanger $q$ is arranged, in which the roller 13 is journalled. This hanger $q$ is supported against the link 14, which itself is supported by a carrier $r$ on the jib 1. The load hanging on the rope is transmitted to the knife-edge $p$, whereby the horizontal part of the rope will always be guided parallel to the links 14.

The combined crane and scale is so constructed that in every position of the jib the power transmitted to the scale lever 11 is always the same. Thus, if by way of example, the load P hanging on the rope is 5000 kg., and the ratio of the levers $m$ and $o$ is equal to 1:10, the pressure on the rod 12 will be equal to 500 kg., and the same load is transmitted to the rod 11 independent from the position of the complete combined crane and scale.

For further explanation it may be stated that the scale lever, which supports with one end the rod 11, transmits by the other end power to the rod $s$, from the lower end of which the sliding weight scale beam $t$ is suspended, which with one arm finds a fixed support on the bracket $u$ and with the other arm plays opposite a hand or point $v$. The sliding weight $w$ will be shifted on the beam $t$ corresponding to the load in known manner.

The scale levers within the jib 1 may be replaced by a cumbent bar guided by links and adapted to transmit its influence exerted by the weight of load to the bar 5.

Such an arrangement is illustrated in Figs. 2 and 3.

In the modified construction shown in Fig. 4, the oscillatory supports 2 and 3 are linked to a rectangular system of oscillatory links arranged on the frame of the crane. The fact of arranging the pivots of the oscillatory supports on the oscillatory part of a rectangular system of links ensures the advantages, that the jib cannot only be shifted parallel, but also that, when so shifted, its position as to height is not altered. Useless lifting work is thus avoided and the height of space is restricted. In the construction shown the rectangular system consists of two upright links 17 and 18, respectively, pivoted at their lower ends to the frame 4 by bolts 19 and interconnected at their upper ends by a rail 20 fastened to the links by bolts 16 to form a parallelogram. The oscillatory supports 2 and 3 are pivoted at their lower ends to the links 17, 18, by bolts 19.

In this retractable crane a second bar $5a$ is pivoted to the bar 5 belonging to the oscillatory support 2 by the aid of a socket or tube 9, the lower end of the bar $5a$ being guided by links 21, supported at one side on a knife-edge carrier 22 firmly mounted on the frame 4. At the other side the links 21 engage a knife-edge carrier 23 arranged on a socket 24 at the lower end of the bar $5a$. The knife-edge carrier 10 of the links 7 is attached to a rail 20. The links 7 engaging the pivotal connection of the two bars 5, $5a$ are so arranged that the bar 5 is parallel to the oscillatory supports 2 and the bar $5a$ parallel to the links 17. Also, in this mode of construction, the axes of the tubes 9, 9, 24 coincide with the axes of the bolts 16, 16 and 19, respectively, the latter having sufficient play all round.

The weight of the load influences the upper bar 5 by the scale levers and the rod 12 and the lower bar $5a$ further transmits the weight of load to the scale by the aid of the rod 11.

The connection of the bars 5 and $5a$ with one another by the tubes 9, 9 and 24 and their arrangement with regard to the oscillatory supports 2 and 3 and to the links 17 and 18 will be understood by reference to Fig. 5. The fact that the tubes 9, 9, 24 surround the bolts 16, 16, 19 is of advantage because, by the position of the latter within the tubes, the operation of the bar can be observed during weighing. The said tubes are also adapted to be used in connection with other crane constructions.

The arrangement of the bars 5 and $5a$ of this modification will be well understood by reference to Fig. 6. Even here the links 6 and 7 do not change their normal horizontal position on any adjustment of the jib 1.

The combined retractable crane and scale shown in Fig. 7 differs from that shown in Fig. 4 inasmuch as there is an inclined jib 1a instead of a horizontal jib and that instead of the two scale levers transmitting the influence of the bar 5 from the load weight a bar 5b is arranged within the jib in a manner known per se pivotally connected at its lower end to the upper end of the bar 5 and guided on top by links 25. The bar 5b carries at its upper end the load roller 13 and is thus influenced directly by the load. If desired, however, the influence may be effected indirectly by the aid of transmission means (scale levers).

By reference to Fig. 8 the arrangement of the bars 5, 5a and 5b and their links will be understood.

It will be understood that, in the construction shown in Fig. 1, an inclined jib may be used and may be provided with a bar 5b running along the jib.

In order to retract the jib 1, or the jib 1a, the oscillatory supports 2, by way of example, in the three constructions, may be provided with an extension 2a (shown in chain-dotted lines), the free end of which is engaged by a suitable driving means.

In the retractable cranes shown, the bar 5 presses, or the bars 5 and 5a respectively, press with their lower ends against the weighing or scale lever within the crane cabin and, of course, the bars may be constructed to transmit the weighing load by a pull on said scale lever, in which event the scale lever within the jib and the scale lever within the cabin must be so disposed relatively to their bearings in such manner that the rods 12 and 11 will become tension rods.

I claim:—

1. A combined oscillatory or retractable crane and scale comprising, a jib oscillatory supports carrying said jib, a bar adapted to be subjected to the load and a scale lever acted upon by said bar, said bar being arranged parallel to one of the oscillatory supports of the jib and links guiding the bar and supported at the ends remote from the bar in such manner that they are shifted parallel to themselves on oscillatory movement of said supports.

2. A combined oscillatory or retractable crane and scale as in claim 1, in which other links are provided pivoted at their lower ends to fixed points, said last named links carrying said oscillatory supports, and a second bar, parallel to one of said carrier links, pivoted to the first named bar whereby one guiding link maintains the first named bar and the second named bar parallel to the oscillatory supports or to the oscillatory carrier links, respectively, and a scale lever acted on by the second named bar.

3. A combined oscillatory or retractable crane and scale as in claim 1 in which the jib is arranged in an inclined position and is associated with a second bar pivoted to the upper end of the first named bar and guided by the guiding links of the first named bar, and a guiding link holding the upper end of said second bar, said second bar being directly or indirectly influenced by a load.

4. A combined oscillatory or retractable crane and scale as in claim 1, comprising a tube at each end of the bar, a pivot passing through each tube for connecting an oscillatory support with another crane element, a knife-edge carrier mounted on said tube.

5. A combined oscillatory or retractable crane and scale as in claim 1 comprising a tube at each end of the bar, a pivot passing through each tube for connecting an oscillatory support with another crane element, a knife-edge carrier mounted on said tube, links engaging the knife-edges on said carrier with one end, a second knife-edge carrier firmly attached to the jib or the frame respectively, the knife-edges of which second carrier being engaged by the other ends of the links.

6. A combined oscillatory or retractable crane and scale as in claim 1 comprising a tube at each end of the bar, a pivot passing through each tube for connecting an oscillatory support with another crane element, a knife-edge carrier mounted on said tube, links engaging the knife-edges on said carrier with one end, a second knife edge carrier firmly attached to the jib or the frame respectively the knife-edges of which second carrier being engaged by the other ends of the links, and the said links arranged parallel to a plane containing the knife-edges of the scale levers.

7. A combined oscillatory or retractable crane and scale as in claim 1 comprising a tube at each end of the bar, a pivot passing through each tube for connecting an oscillatory support with another crane element, a knife-edge carrier mounted on said tube, a plurality of links engaging knife-edges on said carrier with one end, a second knife-edge carrier firmly attached to the jib or the frame, respectively, the knife-edges of which second carrier, engaged by the other ends of the links in such manner that at least one link is subjected to compression when the other links are subjected to tension 8. A combined oscillatory or retractable crane and scale as in claim 1 comprising a tube at each end of the bar, a pivot passing through each tube for connecting an oscillatory support with another crane element, a knife-edge carrier mounted on said tube, a plurality of links engaging the knife-edges on said carrier with one end, a second knife-edge carrier firmly attached to the jib or frame respectively, the knife-edges of which second carried being engaged by the other ends of the links, said links, tension links and compression links being of equal lengths.

In testimony whereof I have signed my name to this specification.

FRIEDRICH AUGUST ALBERT ESSMANN.